(12) United States Patent
Wang et al.

(10) Patent No.: US 11,801,837 B2
(45) Date of Patent: Oct. 31, 2023

(54) VEHICLE CONTROL METHOD, DEVICE, STORAGE MEDIUM, AND VEHICLE

(71) Applicant: GREAT WALL MOTOR COMPANY LIMITED, Baoding (CN)

(72) Inventors: Yinlei Wang, Baoding (CN); Wei Pan, Baoding (CN); Tengfei Guo, Baoding (CN); Yushan Li, Baoding (CN); Xiu Liu, Baoding (CN); Weifeng Deng, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 17/789,511

(22) PCT Filed: Mar. 30, 2021

(86) PCT No.: PCT/CN2021/084073
§ 371 (c)(1),
(2) Date: Jun. 27, 2022

(87) PCT Pub. No.: WO2021/213153
PCT Pub. Date: Oct. 28, 2021

(65) Prior Publication Data
US 2023/0037049 A1 Feb. 2, 2023

(30) Foreign Application Priority Data
Apr. 21, 2020 (CN) .......................... 202010318118.4

(51) Int. Cl.
*B60W 30/18* (2012.01)
*B60W 10/06* (2006.01)
*B60W 10/18* (2012.01)

(52) U.S. Cl.
CPC ...... *B60W 30/18027* (2013.01); *B60W 10/06* (2013.01); *B60W 10/18* (2013.01);
(Continued)

(58) Field of Classification Search
CPC ................ B60W 10/06; B60W 10/18; B60W 30/18027; B60W 2510/182;
(Continued)

(56) References Cited

U.S. PATENT DOCUMENTS

| 10,175,713 B1 | 1/2019 | Howell et al. | |
| 2013/0090799 A1* | 4/2013 | Nakamura | B60L 50/51 701/22 |

(Continued)

FOREIGN PATENT DOCUMENTS

| CN | 103287422 | 9/2013 |
| CN | 104670207 | 6/2015 |

(Continued)

OTHER PUBLICATIONS

CNIPA, First Office Action for CN Application No. 202010318118.4, dated Nov. 10, 2021.
(Continued)

*Primary Examiner* — Edwin A Young
(74) *Attorney, Agent, or Firm* — Hodgson Russ LLP

(57) ABSTRACT

The present disclosure relates to the technical field of vehicles, and particularly to a vehicle control method and apparatus, a storage medium and a vehicle. The method includes: acquiring a pressure of a brake master cylinder and an opening degree of an accelerator pedal; when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and when the
(Continued)

---

101 — Acquire a pressure of a brake master cylinder and an opening degree of an accelerator pedal 102 — When that the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, control the vehicle to enter an activated state of a launch starting function 103 — When the vehicle is in the activated state, control an engine of the vehicle to output a target torque according to the opening degree of the accelerator pedal, and control a brake state of the vehicle according to the pressure of the brake master cylinder vehicle is in the activated state, controlling an engine of the vehicle to output a target torque. Thus, a driver enables the vehicle to enter the activated state of the launch starting function before starting by operating a brake pedal and the accelerator pedal at the same time, and also enables the vehicle to provide a torque output according to a state of the accelerator pedal while being in a brake state, thus enabling the vehicle to start quickly with greater power, reducing an acceleration time and realizing launch starting.

20 Claims, 6 Drawing Sheets

(52) U.S. Cl.
CPC ... *B60W 2510/182* (2013.01); *B60W 2540/10* (2013.01); *B60W 2540/12* (2013.01); *B60W 2710/0666* (2013.01); *B60W 2710/18* (2013.01)

(58) Field of Classification Search
CPC ......... B60W 2540/10; B60W 2540/12; B60W 2710/0666; B60W 2710/18
See application file for complete search history.

(56) References Cited

U.S. PATENT DOCUMENTS

| | | | |
|---|---|---|---|
| 2013/0238216 A1* | 9/2013 | Yamamoto | F02D 35/00 701/101 |
| 2015/0266479 A1 | 9/2015 | Blakeway et al. | |
| 2016/0016469 A1* | 1/2016 | Yamada | B60W 30/18063 701/22 |

FOREIGN PATENT DOCUMENTS

| | | |
|---|---|---|
| CN | 109278725 | 1/2019 |
| CN | 109987094 | 7/2019 |
| CN | 110126828 | 8/2019 |
| CN | 110281863 | 9/2019 |
| CN | 110696830 | 1/2020 |
| CN | 112208528 | 1/2021 |
| FR | 2828565 | 2/2003 |

OTHER PUBLICATIONS

WIPO, International Search Report for PCT/CN2021/084073, dated May 31, 2021.

* cited by examiner

VEHICLE CONTROL METHOD, DEVICE, STORAGE MEDIUM, AND VEHICLE

CROSS REFERENCE TO RELATED APPLICATIONS

The present disclosure is a U.S. national stage entry of International Application No. PCT/CN2021/084073, filed Mar. 30, 2021, which claims priority to Chinese Patent Application No. 202010318118.4, filed Apr. 21, 2020, the entire disclosures of which are incorporated herein by reference.

TECHNICAL FIELD

The present disclosure relates to the technical field of vehicles, and particularly, to a vehicle control method, an apparatus, a storage medium and a vehicle.

BACKGROUND

In existing vehicles, a brake pedal and an accelerator pedal serve as core components to identify a driving intention of a driver. The vehicle may brake by stepping on the brake pedal on one side, and may start by stepping on the accelerator pedal on one side. Generally speaking, when the brake pedal is stepped on and after the brake pedal is completely stepped on, a torque output of an engine may be stopped. Only when the brake pedal is slowly released, the torque of the engine may start to load slowly. When the brake pedal is completely released, the vehicle may start to enter a creeping mode and start to run slowly. After stepping on the accelerator, the vehicle recognizes an acceleration intention of the driver and starts to run according to the intention of the driver.

In the prior art, as two independent components, the brake pedal and the accelerator pedal play the roles of braking and acceleration respectively, and the two are designed on the same side, so that the driver can only step on one at a same time, that is, the driving intention cannot be input through the accelerator pedal when the driver brakes through the brake pedal, and braking cannot be carried out at the same time when the driver accelerates through the accelerator pedal. Moreover, when the brake pedal is stepped on, the engine is prohibited to output a torque. In case of resuming running after stopping braking, it is necessary to enter the creeping mode first, and then control the engine to slowly increase the output torque through the accelerator pedal to increase a vehicle speed, wherein the vehicle speed increases slowly.

SUMMARY

The object of the present disclosure is to provide a vehicle control method and apparatus, a storage medium and a vehicle, which can greatly improve starting power before a vehicle starts by operating a brake pedal and an accelerator pedal at the same time, so that the vehicle can quickly start with greater power, that is, realize a launch starting function.

In order to achieve the above object, the present disclosure provides a vehicle control method. The method includes:

acquiring a pressure of a brake master cylinder and an opening degree of an accelerator pedal;

when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and when the vehicle is in the activated state, controlling an engine of the vehicle to output a target torque according to the opening degree of the accelerator pedal, and controlling a brake state of the vehicle according to the pressure of the brake master cylinder.

Optionally, before the step of controlling the vehicle to enter the activated state of the launch starting function, the method further includes:

acquiring first vehicle state data.

Optionally, the step of controlling the vehicle to enter the activated state of the launch starting function, includes:

when the first vehicle state data satisfies all first preset conditions for entering the activated state, controlling the vehicle to enter the activated state of the launch starting function;

the first preset conditions including one or more of the following conditions:

the engine is in a running state, a clutch transmission gear of the vehicle is in a forward gear, a vehicle speed is less than a first preset vehicle speed threshold, an electronic stability system is in an off state, an electronic parking brake system is in an off state, a seat belt is in a fastened state, and a power system of the vehicle is trouble free.

Optionally, when the vehicle is in the activated state, the step of controlling the engine of the vehicle to output the target torque according to the opening degree of the accelerator pedal, and controlling the brake state of the vehicle according to the pressure of the brake master cylinder, includes:

receiving an engine speed limit threshold sent by a clutch transmission, wherein the engine speed limit threshold is used for ensuring that the vehicle is capable of keeping still when the pressure of the brake master cylinder is greater than the first preset pressure threshold; and determining the target torque according to the engine speed limit threshold and the opening degree of the accelerator pedal, and controlling the engine to output the target torque.

Optionally, the step of determining the target torque according to the engine speed limit threshold and the opening degree of the accelerator pedal, and controlling the engine to output the target torque, includes:

determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and sending the air path torque of the engine and the fire path torque of the engine to the engine, so that the engine outputs the fire path torque of the engine as the target torque.

Optionally, the method further includes:
acquiring second vehicle state data; and
when the second vehicle state data satisfies any one of second preset conditions for quitting the activated state, controlling the vehicle to quit the activated state of the launch starting function;
the second preset conditions including one or more of the following conditions:
the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range;
wherein, the second preset opening degree threshold is less than the first preset opening degree threshold, and the second preset vehicle speed threshold is greater than the first preset vehicle speed threshold.
Optionally, the method further includes:
when the vehicle does not move within a preset duration after entering the activated state, controlling the vehicle to enter a standby state of the launch starting function; and
when the vehicle is in the standby state, the pressure of the brake master cylinder is no greater than a second preset pressure threshold, and the opening degree of the accelerator pedal is no greater than a third preset opening degree threshold, controlling the vehicle to quit the standby state, wherein the second preset pressure threshold is less than the first preset pressure threshold, and the third preset opening degree threshold is less than the second preset opening degree threshold.
Optionally, the method further includes:
when the vehicle is in the activated state and the pressure of the brake master cylinder is no greater than the first preset pressure threshold, increasing an engine speed threshold required by the clutch transmission during gear shifting to a preset target value.
Optionally, the method further includes:
when the vehicle is in the activated state, increasing a safe torque threshold of the clutch transmission.
The present disclosure further provides a vehicle control apparatus, including:
a first acquisition module configured for acquiring a pressure of a brake master cylinder and an opening degree of an accelerator pedal;
a first control module configured for, when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and
a second control module configured for, when the vehicle is in the activated state, controlling an engine of the vehicle to output a target torque according to the opening degree of the accelerator pedal, and controlling a brake state of the vehicle according to the pressure of the brake master cylinder.
Optionally, the apparatus further includes:
a second acquisition module configured for acquiring first vehicle state data;
the first control module being further configured for, when the first vehicle state data satisfies all first preset conditions for entering the activated state, controlling the vehicle to enter the activated state of the launch starting function; and
the first preset conditions including one or more of the following conditions: the engine is in a running state, a clutch transmission gear of the vehicle is in a forward gear, a vehicle speed is less than a first preset vehicle speed threshold, an electronic stability system of a vehicle body of the vehicle is in an off state, an electronic parking brake system of the vehicle is in an off state, a seat belt of the vehicle is in a fastened state, and a power system of the vehicle is trouble free.
Optionally, the second control module includes:
a receiving submodule configured for receiving an engine speed limit threshold sent by a clutch transmission, wherein the engine speed limit threshold is used for ensuring that the vehicle is capable of keeping still when the pressure of the brake master cylinder is greater than the first preset pressure threshold; and
a control submodule configured for determining the target torque according to the engine speed limit threshold and the opening degree of the accelerator pedal, and controlling the engine to output the target torque.
Optionally, the control submodule includes:
a determining submodule configured for determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and
a sending submodule configured for sending the air path torque of the engine and the fire path torque of the engine to the engine, so that the engine outputs the fire path torque of the engine as the target torque.
Optionally, the apparatus further includes:
a third acquisition module configured for acquiring second vehicle state data; and
a third control module configured for, when the second vehicle state data satisfies any one of second preset conditions for quitting the activated state, controlling the vehicle to quit the activated state of the launch starting function;
the second preset conditions including one or more of the following conditions:
the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range;

wherein, the second preset opening degree threshold is less than the first preset opening degree threshold, and the second preset vehicle speed threshold is greater than the first preset vehicle speed threshold.

Optionally, the apparatus further includes:

a fourth control module configured for, when the vehicle does not move within a preset duration after entering the activated state, controlling the vehicle to enter a standby state of the launch starting function; and a fifth control module configured for, when the vehicle is in the standby state, the pressure of the brake master cylinder is no greater than a second preset pressure threshold, and the opening degree of the accelerator pedal is no greater than a third preset opening degree threshold, controlling the vehicle to quit the standby state, wherein the second preset pressure threshold is less than the first preset pressure threshold, and the third preset opening degree threshold is less than the second preset opening degree threshold.

Optionally, the apparatus further includes:

a sixth control module configured for, when the vehicle is in the activated state and the pressure of the brake master cylinder is no greater than the first preset pressure threshold, increasing an engine speed threshold required by the clutch transmission during gear shifting to a preset target value.

The present disclosure further provides a computer-readable storage medium storing a computer program thereon, wherein the program, when executed by a processor, executes the steps of the aforementioned methods.

The present disclosure further provides a vehicle including the vehicle control apparatus above.

The present disclosure further provides a computing-processing device, including:

a memory in which a computer-readable code is stored; and one or more processors, wherein when the computer-readable code is executed by the one or more processors, the computing-processing device executes the aforementioned methods.

The present disclosure further provides a computer program including a computer-readable code that, when executed on a computing-processing device, causes the computing-processing device to execute the aforementioned methods.

Through the foregoing technical solutions, a driver enables the vehicle to enter the activated state of the launch starting function before starting by operating a brake pedal and the accelerator pedal at the same time, and also enables the vehicle to provide a torque output according to a state of the accelerator pedal while being in a brake state and before starting, thus greatly increasing power after starting, enabling the vehicle to start quickly with greater power without undergoing a creeping process, and reducing an acceleration time, thereby realizing the launch starting function.

Other features and advantages of the present disclosure will be described in detail in the detailed description section that follows.

BRIEF DESCRIPTION OF THE DRAWINGS

The accompanying drawings serve to provide a further understanding of the present disclosure and constitute a part of the specification, and are used together with the embodiments to explain the present disclosure, and do not constitute limitations to the present disclosure. In the drawings.

DETAILED DESCRIPTION OF THE EMBODIMENTS

The embodiments of the present disclosure will be further described hereinafter in detail with reference to the drawings. It should be understood that the specific embodiments described herein are only for the purpose of illustration and explanation of the present disclosure and are not intended to limit the present disclosure.

Figure 1:
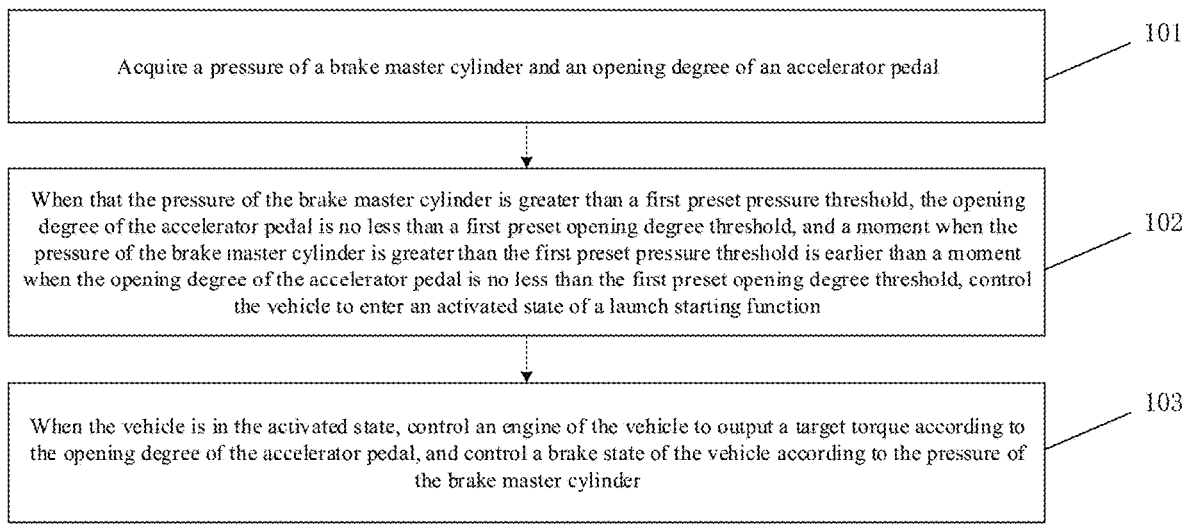
FIG. 1 is a flowchart of a vehicle control method according to an exemplary embodiment of the present disclosure.

FIG. 1 is a flowchart of a vehicle control method according to an exemplary embodiment of the present disclosure. As shown in FIG. 1, the method includes step 101 to step 103.

At step 101, a pressure of a brake master cylinder and an opening degree of an accelerator pedal are acquired.

At step 102, when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, the vehicle is controlled to enter an activated state of a launch starting function.

The pressure of the brake master cylinder corresponds to a degree to which a brake pedal of the vehicle is stepped on. The greater the pressure of the brake master cylinder, the deeper the degree to which the brake pedal is stepped on, which also indicates that the braking intention is stronger. The opening degree of the accelerator pedal can reflect an acceleration intention of a driver.

By setting the first preset pressure threshold and the first preset opening degree threshold, it may be judged that the brake pedal and the accelerator pedal are in a deep-stepped state at current when it is determined that the pressure of the brake master cylinder is greater than the first preset pressure threshold, and the opening degree of the accelerator pedal is no less than the first preset opening degree threshold. In this case, a sequence of the brake pedal and the accelerator pedal entering the deep-stepped state is judged, that is, it is judged whether the driver deeply stepped on the brake pedal first, and then deeply stepped on the accelerator pedal while keeping the brake pedal in the deep-stepped state, such that the pressure of the brake master cylinder is greater than the first preset pressure threshold. Meanwhile, the opening degree of the accelerator pedal is no less than the first preset opening degree threshold, and the moment when the pressure of the brake master cylinder is greater than the first preset pressure threshold is earlier than the moment when the opening degree of the accelerator pedal is no less than the first preset opening degree threshold.

When it is judged that the pressure of the brake master cylinder and the opening degree of the accelerator pedal above both meet the conditions, and the sequence of reaching the above conditions also meets the conditions, it may be judged that the vehicle can enter the activated state of the launch starting function at current.

At step 103, when the vehicle is in the activated state, an engine of the vehicle is controlled to output a target torque according to the opening degree of the accelerator pedal, and a brake state of the vehicle is controlled according to the pressure of the brake master cylinder.

After entering the activated state of the launch starting function, the accelerator pedal and the brake pedal may be used to control the vehicle at the same time. That is, the vehicle may be kept in the brake state in response to the pressure of the brake master cylinder, and the engine may also be controlled to load the target torque according to the opening degree of the accelerator pedal. The target torque may be determined, for example, corresponding to the opening degree of the accelerator pedal.

Through the vehicle control method provided by the foregoing technical solution, the driver enables the vehicle to enter the activated state of the launch starting function before starting by operating a brake pedal and the accelerator pedal at the same time, and also enables the vehicle to provide a torque output according to a state of the accelerator pedal while being in a brake state and before starting, thus greatly increasing power after starting, enabling the vehicle to start quickly with greater power without undergoing a creeping process, and reducing an acceleration time, thereby realizing the launch starting function.

Figure 2:
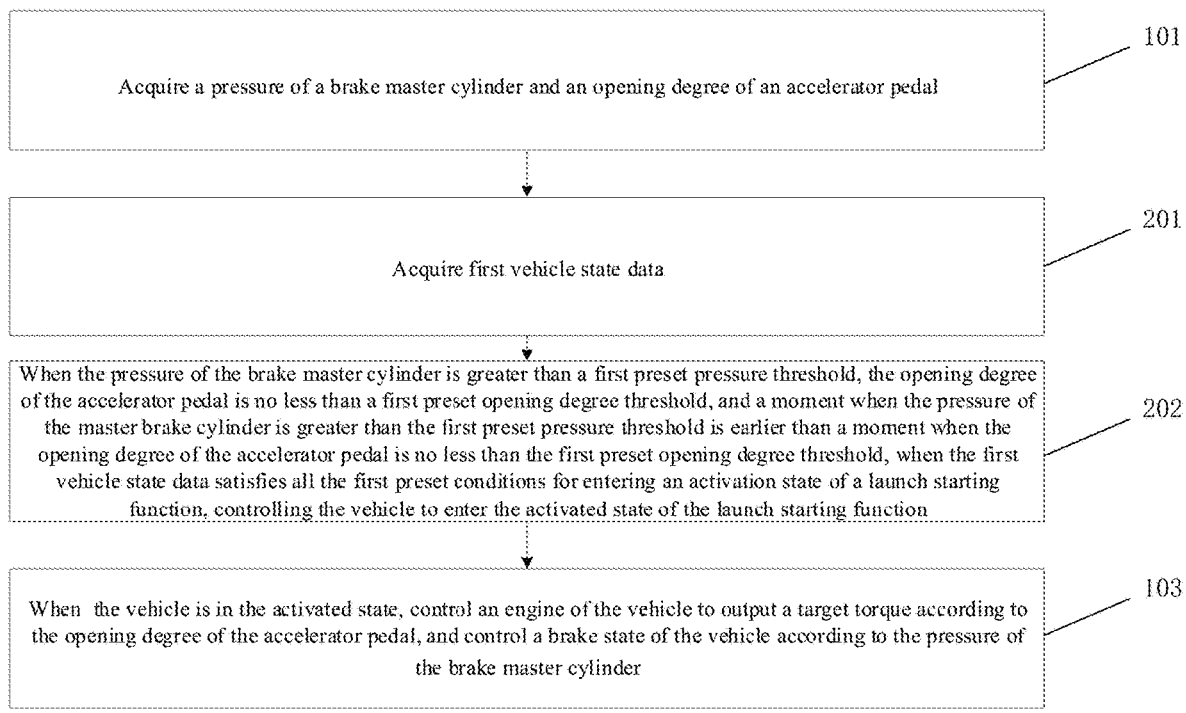
FIG. 2 is a flowchart of a vehicle control method according to one another exemplary embodiment of the present disclosure.

FIG. 2 is a flowchart of a vehicle control method according to one another exemplary embodiment of the present disclosure. As shown in FIG. 2, in addition to step 101 and step 103, the method further includes step 201 and step 202.

At step 201, first vehicle state data is acquired.

At step 202, in addition to satisfying the conditions in step 102 as shown in FIG. 1, it is also necessary to control the vehicle to enter the activated state of the launch starting function when the first vehicle state data satisfies all first preset conditions for entering the activated state.

The first preset conditions include one or more of the following conditions: the engine is in a running state, a clutch transmission gear of the vehicle is in a forward gear, a vehicle speed is less than a first preset vehicle speed threshold, an electronic stability system of the vehicle body is in an off state, an electronic parking brake system is in an off state, a seat belt is in a fastened state, and a power system of the vehicle is trouble free.

The first vehicle state data may be determined according to the contents included in the first preset conditions. For example, if all the above conditions are included in the first preset conditions, the first vehicle state data acquired in step 201 should include the state of the engine, the clutch transmission gear, the vehicle speed, the state of the Electronic stability system (ESP) of the vehicle body, the state of the Electronic parking brake system (EPB), the state of the seat belt, and the state of the power system of the vehicle.

It should be noted by a person skilled in the art that no matter one or more of the above conditions are included in the first preset conditions, it is necessary to ensure that the acquired first vehicle state data can satisfy all the conditions in the first preset conditions before the vehicle is controlled to enter the activated state.

Through the technical method above, the first vehicle state data can be judged via the first preset conditions, so that before the vehicle is controlled to enter the activated state of the launch starting function, the current state of the vehicle is further ensured to be capable of realizing the launch starting function on the premise of ensuring safety.

Figure 3:
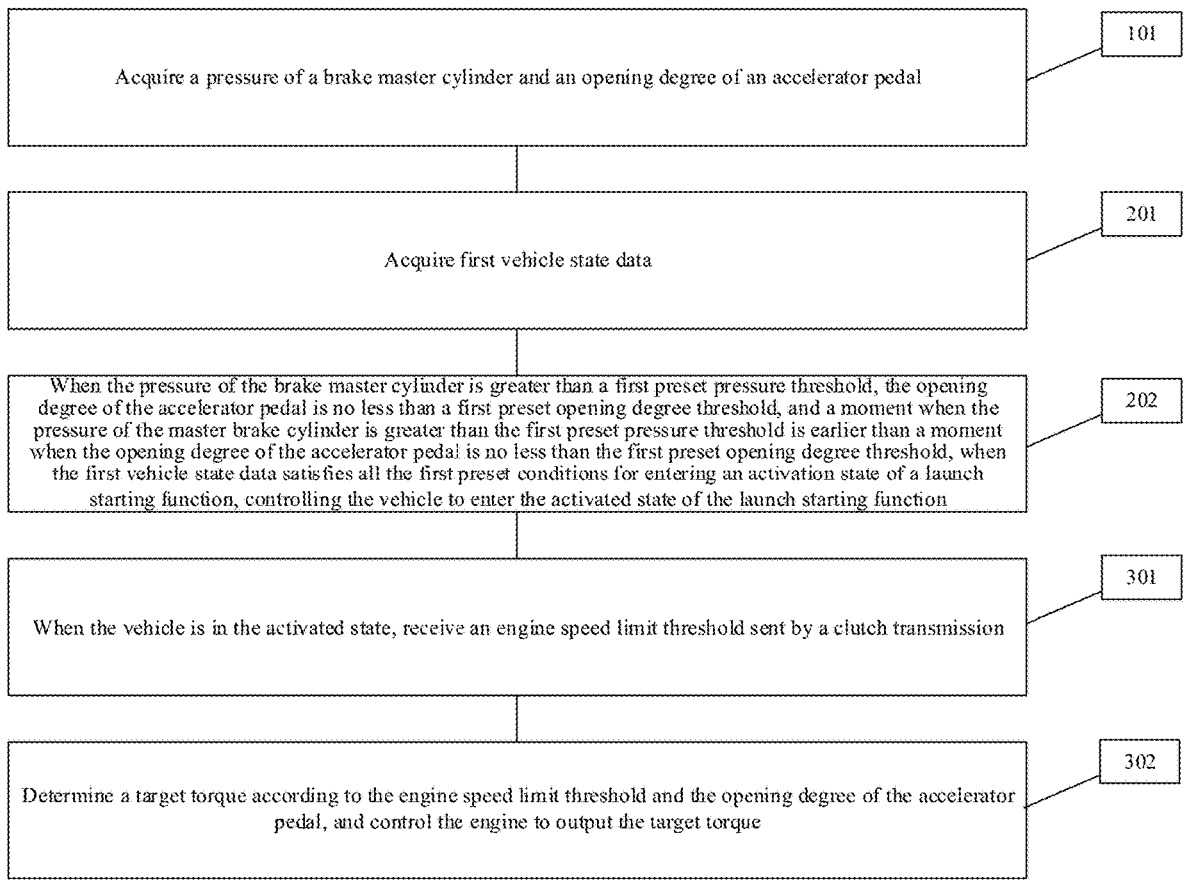
FIG. 3 is a flowchart of a vehicle control method according to one another exemplary embodiment of the present disclosure.

FIG. 3 is a flowchart of a vehicle control method according to an exemplary embodiment of the present disclosure. As shown in FIG. 3, in addition to step 101, step 201 and step 202 as shown in FIG. 2, the method further includes step 301 and step 302.

At step 301, when the vehicle is in the activated state, an engine speed limit threshold sent by a clutch transmission is received. The engine speed limit threshold is used for ensuring that the vehicle is capable of keeping still when the pressure of the brake master cylinder is greater than the first preset pressure threshold.

At step 302, the target torque is determined according to the engine speed limit threshold and the opening degree of the accelerator pedal, and the engine is controlled to output the target torque.

After the vehicle is controlled to enter the activated state of the launch starting function, it is necessary to control the brake state of the vehicle according to the pressure of the brake master cylinder, and it is also necessary to control the engine of the vehicle to output the target torque according to the opening degree of the accelerator pedal. When the vehicle just enters the activated state, both the brake pedal and the accelerator pedal are in a deep-stepped state. When the brake state of the vehicle is controlled according to the pressure of the brake master cylinder, it is necessary to ensure that the vehicle keep still when the engine outputs the target torque.

Therefore, in order to ensure that the target torque output by the engine may not cause the vehicle to move when the brake pedal is in the deep-stepped state, the engine speed limit threshold may be determined by the clutch transmission according to a current clutch state. In addition, when determining the target torque of the engine, the target torque may be determined according to both the opening degree of the accelerator pedal and the engine speed limit threshold, so that the target torque output by the engine may not exceed the limit of the engine speed limit threshold, thus ensuring that the vehicle can not only control the torque output of the engine according to the opening degree of the accelerator pedal, but also ensure a braking effect of the pressure of the brake master cylinder on the vehicle after the vehicle enters the activated state of the launch starting function.

For example, it may be directly determined according to the opening degree of the accelerator pedal that the target torque is ANm. After the target torque is sent to the engine, the torque of the engine may gradually increase and the engine speed may also gradually increase. When the target engine speed is improved till that a difference between the target engine speed and the engine speed limit threshold is smaller than a preset speed value, the target torque may be reduced to BNm and sent to the engine, so as to control an increasing speed of the engine torque and a final target torque, thereby ensuring that the engine speed may not exceed the engine speed limit threshold no matter in the process of torque increasing or after reaching the target torque.

In addition, the engine speed limit threshold received from the clutch transmission increases slowly according to the decrease of the pressure of the brake master cylinder, that is, when a driver slowly releases the brake pedal, the pressure of the brake master cylinder may also decrease slowly, and correspondingly, a brake resistance of the vehicle may also decrease continuously, until a driving force of the power system of the vehicle exceeds the brake resistance, the vehicle begins to start quickly according to the loaded engine torque and the engine speed. Therefore, with the decrease of the pressure of the brake master cylinder, the clutch transmission may also gradually increase the engine speed limit threshold, so as to ensure that the engine torque and the engine speed can also be increased with the decrease of the pressure of the brake master cylinder, so as to achieve expectation when the vehicle starts, and realize the launch starting of the vehicle.

The clutch transmission above may be any type of clutch transmission, as long as the clutch transmission can realize the functions of controlling the clutch of the vehicle and outputting the corresponding engine speed limit threshold according to the pressure of the brake master cylinder.

In a probable embodiment, as shown in FIG. 3, in step 302, the step of determining the target torque according to the engine speed limit threshold and the opening degree of the accelerator pedal, and controlling the engine to output the target torque, includes: determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and sending the air path torque of the engine and the fire path torque of the engine to the engine, so that the engine outputs the fire path torque of the engine as the target torque.

That is, when the engine of the vehicle is controlled to output the target torque, two torque values, which are the air path torque of the engine and the fire path torque of the engine, may be sent to the engine. The air path torque of the engine may be, for example, configured for controlling an opening degree of a throttle valve, and the fire path torque of the engine may be configured for controlling a magnitude of an ignition advance angle, and the target torque actually executed by the engine is the fire path torque of the engine. By controlling the engine according to the air path torque of the engine which is greater than the fire path torque of the engine, the actual torque of the engine can be promoted to reach the target torque, which is the fire path torque of the engine more quickly, and then the engine can finish the torque loading in a shorter time after the vehicle enters the activated state of the launch starting function, so as to ensure the power required for the launch starting.

The preset torque threshold of the difference between the air path torque of the engine and the fire path torque of the engine may be, for example, 50 Nm.

Figure 4:
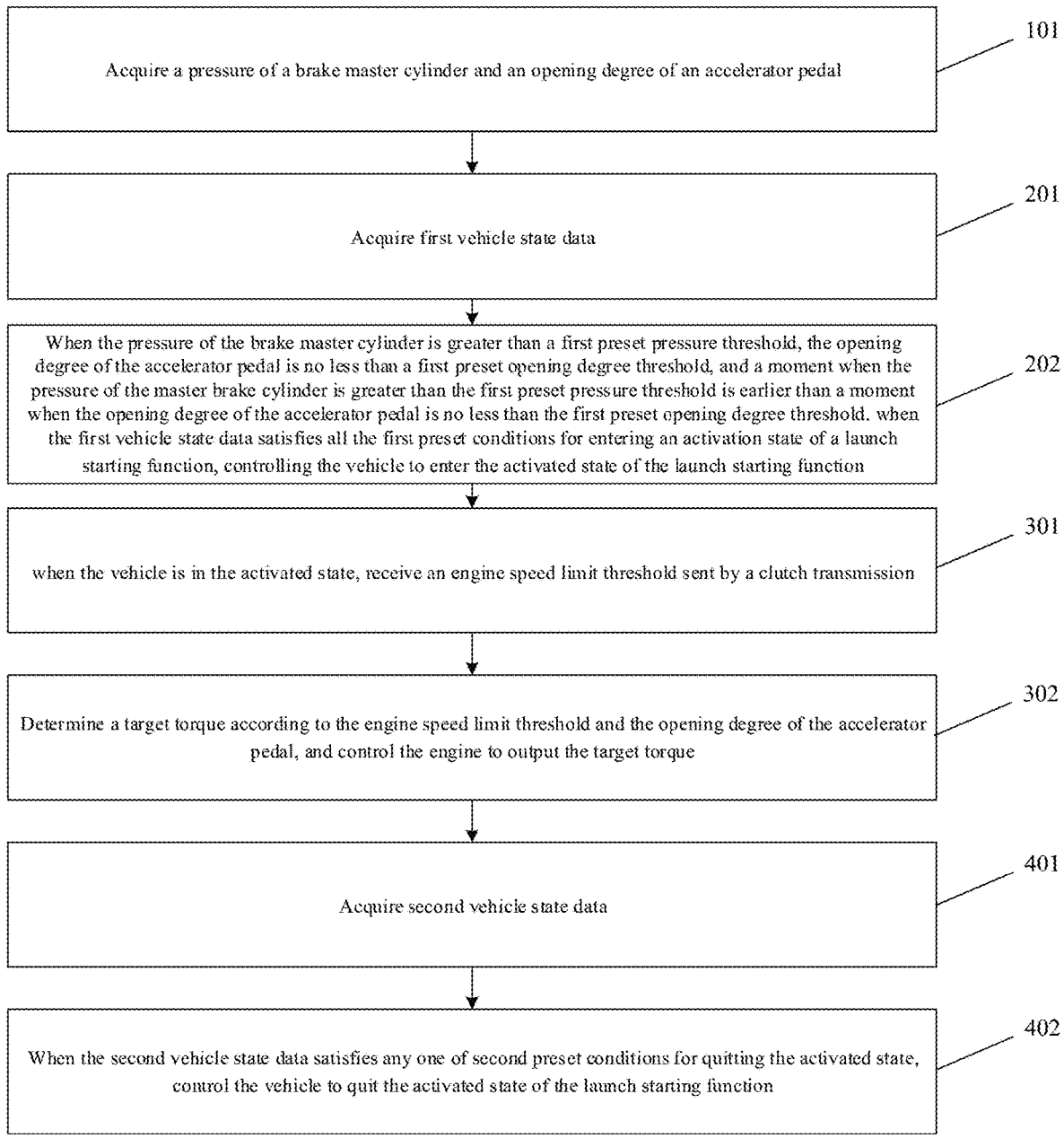
FIG. 4 is a flowchart of a vehicle control method according to one another exemplary embodiment of the present disclosure.

FIG. 4 is a flowchart of a vehicle control method according to one another exemplary embodiment of the present disclosure. As shown in FIG. 4, the method further includes step 401 and step 402.

At step 401, second vehicle state data is acquired.

At step 402, when the second vehicle state data satisfies any one of second preset conditions for quitting the activated state, the vehicle is controlled to quit the activated state of the launch starting function.

The second preset condition include one or more of the following conditions: the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range; wherein, the second preset opening degree threshold is less than the first preset opening degree threshold, and the second preset vehicle speed threshold is greater than the first preset vehicle speed threshold.

The second vehicle state data may include vehicle state data corresponding to all the conditions included in the second preset conditions, or may only include vehicle state data corresponding to some of the conditions included in the second preset conditions. Before judging whether the condition of quitting the activated state is satisfied according to the second vehicle state data, the vehicle can be controlled to quit the activated state as long as any one of the second vehicle state data satisfies the conditions in the second preset conditions.

In addition, the above-mentioned first preset opening degree threshold may be, for example, 100% in the first preset conditions, that is, only when the opening degree of the accelerator pedal is no less than 100% can meet the state of the opening degree of the accelerator pedal before entering the activated state. The second preset opening degree threshold may be, for example, 90% in the second preset conditions. For example, the vehicle is successfully started in the activated state of the launch starting function. In the normal running process after starting, the vehicle does not need to accelerate all the time, a driver can release the accelerator and drive the vehicle normally. In this case, it may be controlled to quit the activated state of the launch starting function according to a magnitude relationship between the opening degree of the accelerator pedal and the second preset opening degree threshold. In another case, after the vehicle enters the activated state of the launch starting function, and the driver no longer needs to perform the launch starting, then the opening degree of the accelerator pedal may be reduced by releasing the accelerator pedal, so as to control the vehicle to quit the activated state.

After quitting the activated state of the launch starting function, the vehicle may not be controlled at the same time according to the opening degree of the accelerator pedal and the pressure of the brake master cylinder, and can only start slowly as described in the background part.

Figure 5:
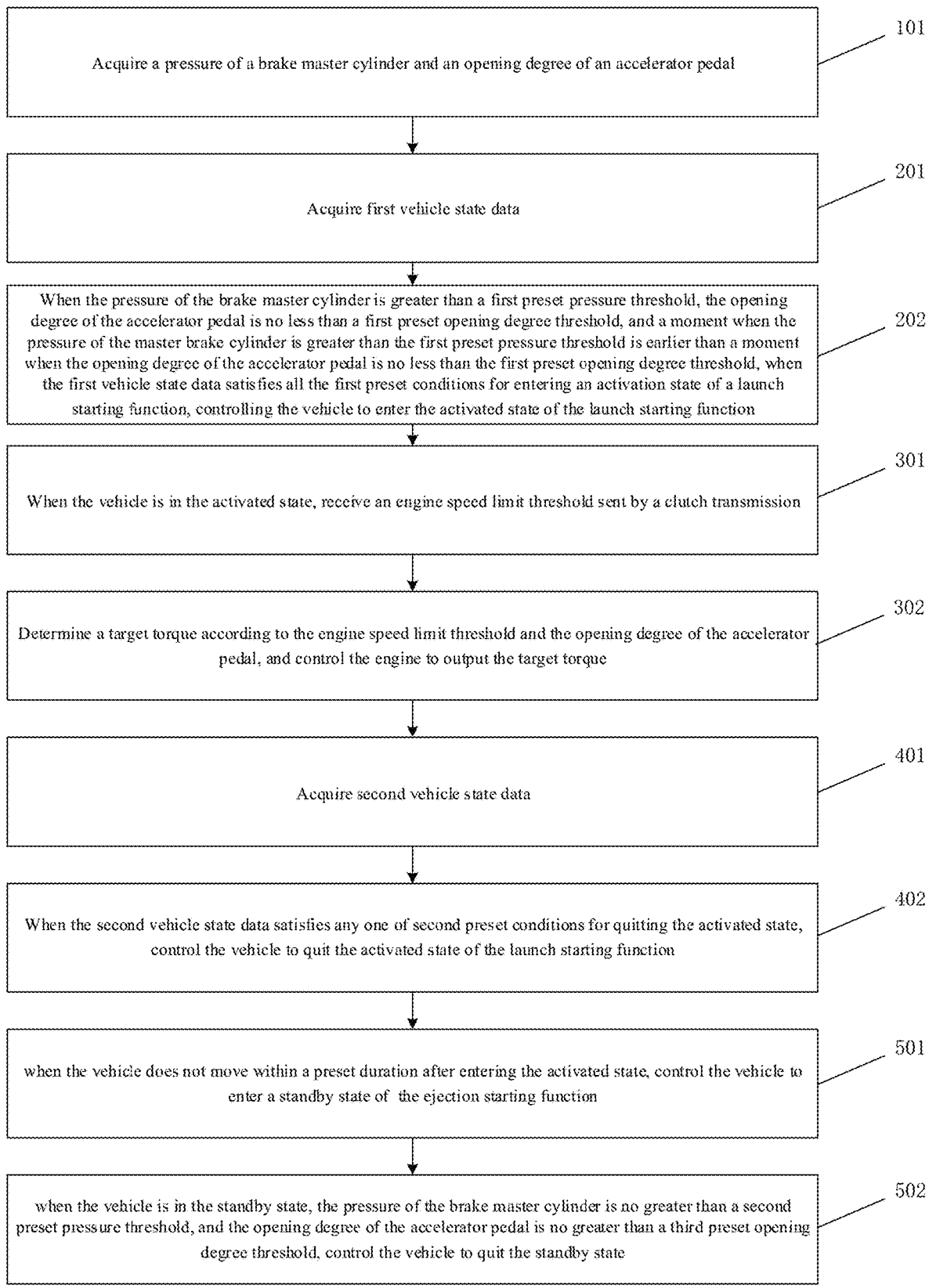
FIG. 5 is a flowchart of a vehicle control method according to one another exemplary embodiment of the present disclosure.

FIG. 5 is a flowchart of a vehicle control method according to one another exemplary embodiment of the present disclosure. As shown in FIG. 5, the method further includes step 501 and step 502.

At step 501 when the vehicle does not move within a preset duration after entering the activated state, the vehicle is controlled to enter a standby state of the launch starting function.

At step 502, when the vehicle is in the standby state, the pressure of the brake master cylinder is no greater than a second preset pressure threshold, and the opening degree of the accelerator pedal is no greater than a third preset opening degree threshold, the vehicle is controlled to quit the standby state, wherein the second preset pressure threshold is less than the first preset pressure threshold, and the third preset opening degree threshold is less than the second preset opening degree threshold.

After the vehicle enters the standby state of the launch starting function because the duration in the activated state exceeds the preset duration, the vehicle may not be controlled at the same time according to the opening degree of the accelerator pedal and the pressure of the brake master cylinder. Moreover, it is impossible to directly judge whether the vehicle satisfies to enter the activated state of the launch starting function according to step 202 as shown in FIG. 2, and it is only possible to judge the pressure of the brake master cylinder and the opening degree of the accelerator pedal. After it is determined that the pressure of the brake master cylinder and the opening degree of the accelerator pedal satisfy the conditions for quitting the standby state, the vehicle quits the standby state first, and then the vehicle may be controlled to enter the activated state when it is judged that the conditions for entering the activated state of the launch starting function are satisfied.

If the pressure of the brake master cylinder and the opening degree of the accelerator pedal do not satisfy the above conditions of being no greater than the second preset pressure threshold and being no greater than the third preset opening degree threshold after the vehicle enters the standby state of the launch starting function, the launch starting of the vehicle cannot be realized again, and the vehicle may only be conventionally controlled according to the brake pedal and the accelerator pedal respectively.

By setting the second preset pressure threshold and the third preset opening degree threshold, the condition of quitting the standby state of the launch starting function is that the multifunctional pedal and the accelerator pedal are both released. For example, both the second preset pressure threshold and the third preset opening degree threshold may be set as 0%.

In a probable embodiment, the vehicle control method further includes: when the vehicle is in the activated state and the pressure of the brake master cylinder is no greater than the first preset pressure threshold, increasing an engine speed threshold required by the clutch transmission during gear shifting to a preset target value. When the vehicle is in the activated state of the launch starting function and the pressure of the brake master cylinder is no greater than the first preset pressure threshold, it means that a driver releases the deep-stepped brake pedal, reduces the pressure of the brake master cylinder, and is ready to start the launch starting. When the vehicle starts, the gear in which the vehicle is located is generally a low gear, and in a vehicle that can realize automatic gear shifting, the gear that needs to be switched may be determined according to an engine speed of the vehicle.

Therefore, in order to enable the vehicle to acquire more sufficient power in a low gear when realizing the launch starting, the engine speed threshold required for the clutch transmission to automatically shift gears is temporarily increased, so that the vehicle can reach a higher engine speed in the low gear without shifting gears during the launch starting, thus obtaining higher starting power. The preset target value corresponding to the engine speed threshold may be determined according to the actual conditions of the vehicle. After quitting the activated state of the launch starting function, the increased engine speed threshold of the gear shifting point may be restored to a normal value.

In a possible implementation, when the vehicle is in the activated state, the clutch transmission may also increase a safe torque threshold, so as to avoid being identified as a safe fault by the clutch transmission due to excessive engine torque during the process of the launch starting.

Figure 6:
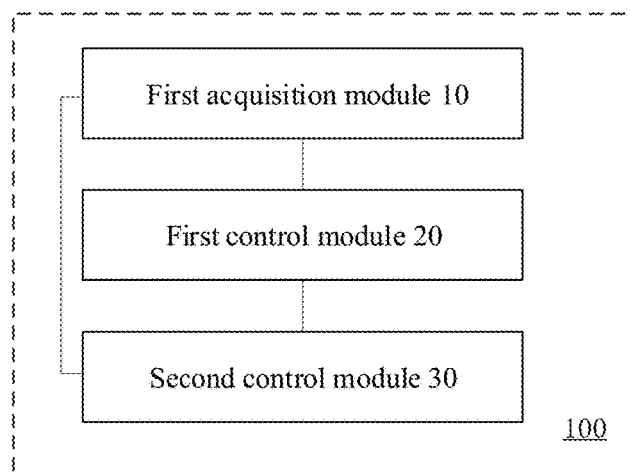
FIG. 6 is a structural block diagram of a vehicle control apparatus according to an exemplary embodiment of the present disclosure.

FIG. 6 is a structural block diagram of a vehicle control apparatus 100 according to an exemplary embodiment of the present disclosure. As shown in FIG. 6, the apparatus 100 includes: a first acquisition module 10 configured for acquiring a pressure of a brake master cylinder and an opening degree of an accelerator pedal; a first control module 20 configured for, when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and a second control module 30 configured for, when the vehicle is in the activated state, controlling an engine of the vehicle to output a target torque according to the opening degree of the accelerator pedal, and controlling a brake state of the vehicle according to the pressure of the brake master cylinder.

Through the vehicle control apparatus provided by the foregoing technical solution, a driver enables the vehicle to enter the activated state of the launch starting function before starting by operating a brake pedal and the accelerator pedal at the same time, and also enables the vehicle to provide a torque output according to a state of the accelerator pedal while being in a brake state and before starting, thus greatly increasing power after starting, enabling the vehicle to start quickly with greater power without undergoing a creeping process, and reducing an acceleration time, thereby realizing the launch starting function.

Figure 7:
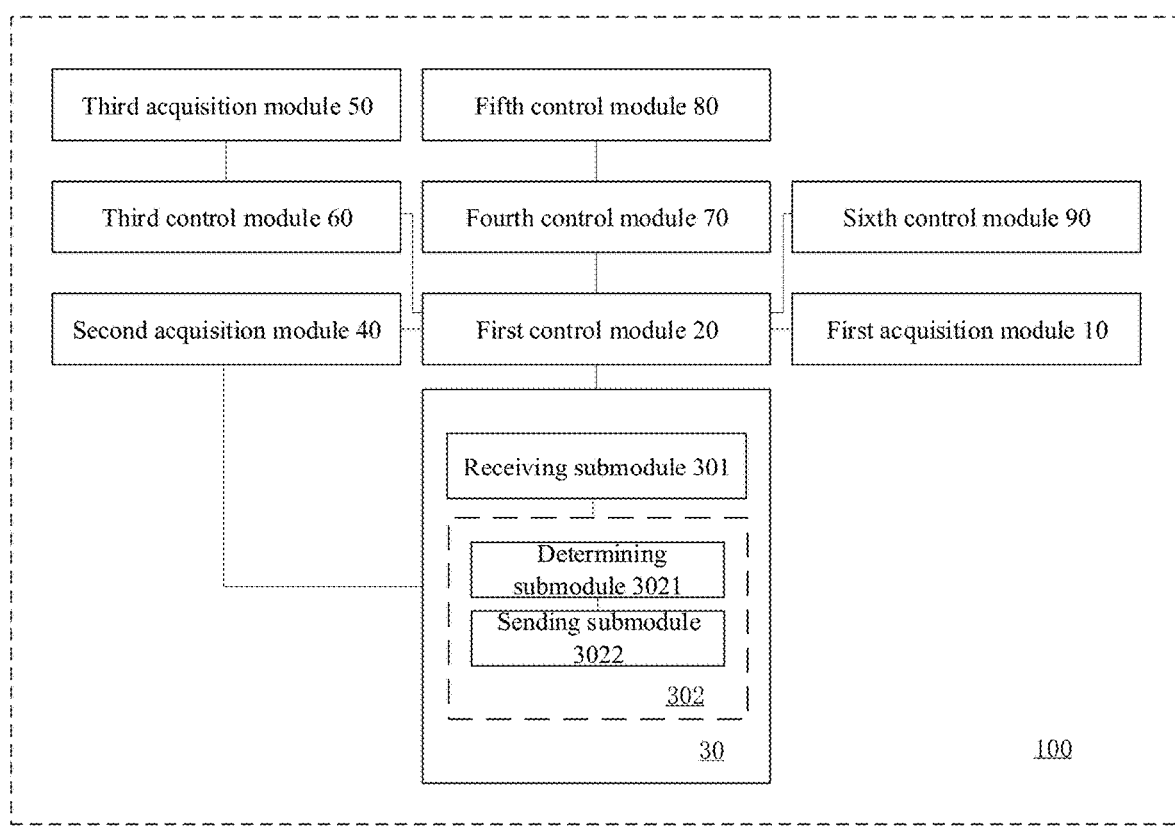
FIG. 7 is a structural block diagram of a vehicle control apparatus according to one another exemplary embodiment of the present disclosure.

FIG. 7 is a structural block diagram of a vehicle control apparatus according to one another exemplary embodiment of the present disclosure. As shown in FIG. 7, the apparatus 100 further includes: a second acquisition module 40 configured for acquiring first vehicle state data; the first control module 20 being further configured for, when the first vehicle state data satisfies all first preset conditions for entering the activated state, controlling the vehicle to enter the activated state of the launch starting function; and the first preset conditions including one or more of the following conditions: the engine is in a running state, a clutch transmission gear of the vehicle is in a forward gear, a vehicle speed is less than a first preset vehicle speed threshold, an electronic stability system is in an off state, an electronic parking brake system is in an off state, a seat belt is in a fastened state, and a power system of the vehicle is trouble free.

As shown in FIG. 7, the second control module 30 includes: a receiving submodule 301 configured for receiving an engine speed limit threshold sent by a clutch transmission, wherein the engine speed limit threshold is used for ensuring that the vehicle is capable of keeping still when the pressure of the brake master cylinder is greater than the first preset pressure threshold; and a control submodule 302 configured for determining the target torque according to the engine speed limit threshold and the opening degree of the accelerator pedal, and controlling the engine to output the target torque.

As shown in FIG. 7, the control submodule 302 includes: a determining submodule 3021 configured for determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and a sending submodule 3022 configured for sending the air path torque of the engine and the fire path torque of the engine to the engine, so that the engine outputs the fire path torque of the engine as the target torque.

As shown in FIG. 7, the apparatus further includes a third acquisition module 50 configured for acquiring second vehicle state data; and a third control module 60 configured for, when the second vehicle state data satisfies any one of second preset conditions for quitting the activated state, controlling the vehicle to quit the activated state of the launch starting function; the second preset conditions including one or more of the following conditions: the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range; wherein, the second preset opening degree threshold is less than the first preset opening degree threshold, and the second preset vehicle speed threshold is greater than the first preset vehicle speed threshold.

As shown in FIG. 7, the apparatus further includes a fourth control module 70 configured for, when the vehicle does not move within a preset duration after entering the activated state, controlling the vehicle to enter a standby state of the launch starting function; and a fifth control module 80 configured for, when the vehicle is in the standby state, the pressure of the brake master cylinder is no greater than a second preset pressure threshold, and the opening degree of the accelerator pedal is no greater than a third preset opening degree threshold, controlling the vehicle to quit the standby state, wherein the second preset pressure threshold is less than the first preset pressure threshold, and the third preset opening degree threshold is less than the second preset opening degree threshold.

As shown in FIG. 7, the apparatus further includes a sixth control module 90 configured for, when the vehicle is in the activated state and the pressure of the brake master cylinder is no greater than the first preset pressure threshold, increasing an engine speed threshold required by the clutch transmission during gear shifting to a preset target value.

It can be clearly understood by a person skilled in the art that, for the convenience and conciseness of description, only the division of the above-mentioned function modules is exemplified. In practical application, the above-mentioned function allocation may be distributed to be completed by different function modules as required, that is, an internal structure of the apparatus is divided into different function modules to complete all or part of the above-described functions. The specific working processes of the function modules described above may refer to the corresponding processes in the aforementioned method embodiments, and will not be described in detail here.

The embodiments of the present disclosure further provide a computer-readable storage medium storing a computer program thereon, wherein the program, when executed by a processor, executes the steps of the aforementioned vehicle control methods.

The present disclosure further provides a vehicle including the vehicle control apparatus 100 above.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing-processing device according to the embodiments of the present disclosure may be implemented by using a microprocessor or a digital signal processor (DSP) in practice. The present disclosure may also be implemented as device or apparatus programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 8:
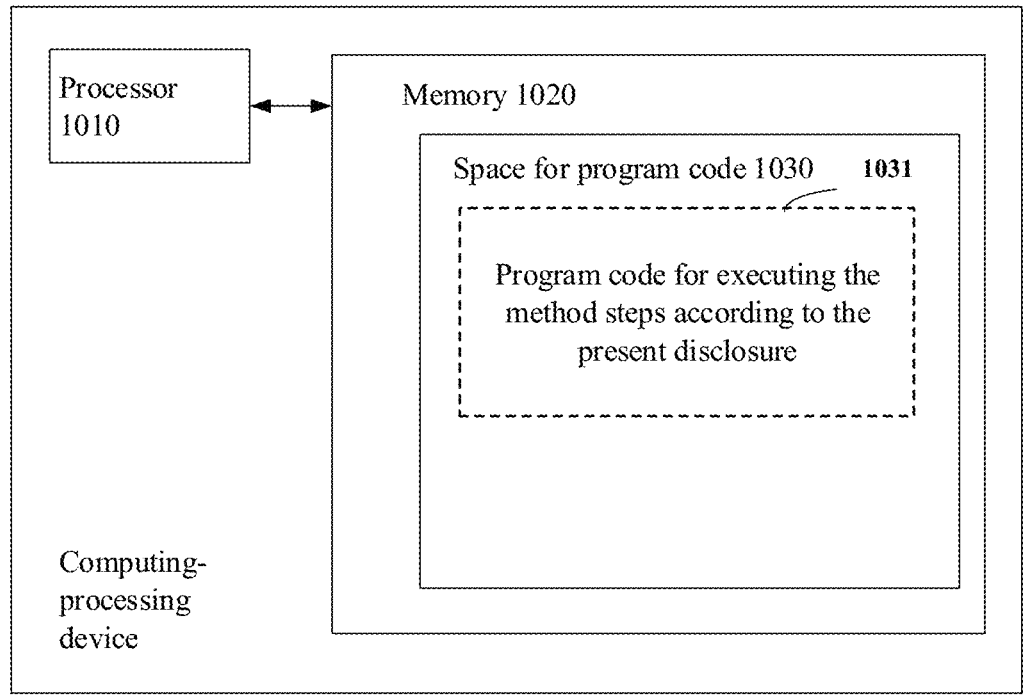
FIG. 8 schematically shows a block diagram of computing-processing device for executing the method according to the present disclosure.
Figure 9:
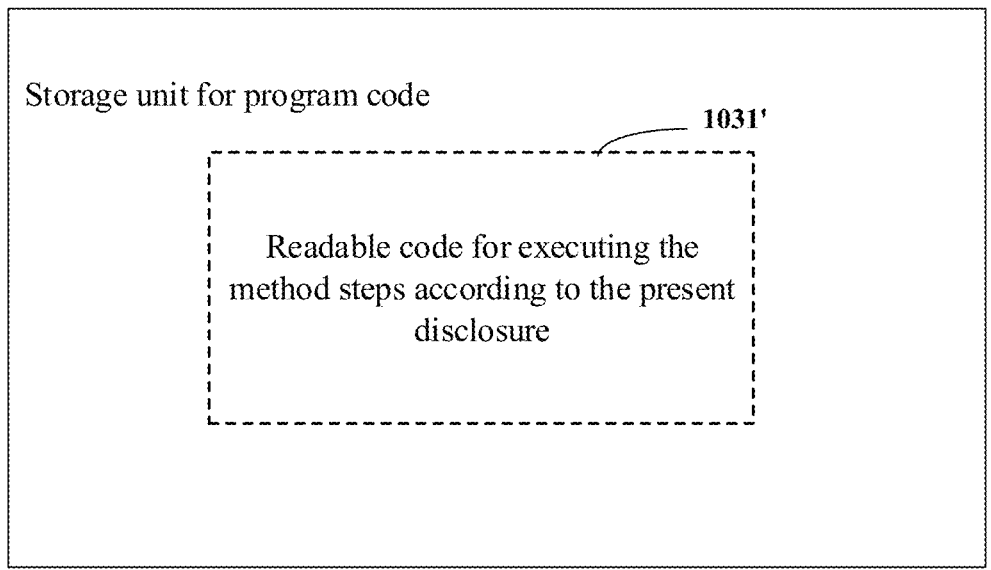
FIG. 9 schematically shows a storage unit for holding or carrying a program code for implementing the method according to the present disclosure.

For example, FIG. 8 shows a computing-processing device that can implement the method according to the present disclosure. The computing-processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. These computer program products include program code carriers such as hard disks, compact disks (CD), memory cards, or floppy disks. Such computer program products are usually portable or fixed storage units as shown in FIG. 9. The storage unit may have storage segments or storage spaces with similar arrangement to the memory 1020 of the computing-processing device in FIG. 8. The program codes may for example be compressed in a suitable form. Generally, the storage unit contains a computer-readable code 1031', which can be read by a processor like 1010. When those codes are executed by the computing-processing device, the codes cause the computing-processing device to implement each of the steps of the method described above.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

Preferred embodiments of the present disclosure are described in detail above with reference to the drawings, but the present disclosure is not limited to the specific details of the above-described embodiments. Various simple variations of the technical solution of the present disclosure can be made within the scope of the technical concept of the present disclosure, and these simple variations are within the scope of the present disclosure.

In addition, it should be noted that the specific technical features described in the above specific embodiments may be combined in any suitable way without contradiction. explained separately in this disclosure. In order to avoid unnecessary repetition, various possible combinations will not be explained separately in the present disclosure.

In addition, the various different embodiments of the present disclosure may also be carried out in any combination as long as it does not contravene the idea of the present disclosure, which should also be regarded as the disclosure of the present disclosure.

The invention claimed is:

1. A vehicle control method, comprising:
   by one or more processors, acquiring a pressure of a brake master cylinder and an opening degree of an accelerator pedal;
   by the one or more processors, when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and
   by the one or more processors, when the vehicle is in the activated state, controlling an engine of the vehicle to output a target torque according to the opening degree of the accelerator pedal, and controlling a brake state of the vehicle according to the pressure of the brake master cylinder.

2. The method according to claim 1, wherein before the step of controlling the vehicle to enter the activated state of the launch starting function, the method further comprises:
   acquiring first vehicle state data.

3. The method according to claim 2, wherein the step of controlling the vehicle to enter the activated state of the launch starting function, comprises:
   when the first vehicle state data satisfies all first preset conditions for entering the activated state, controlling the vehicle to enter the activated state of the launch starting function;
   wherein the first preset conditions comprise one or more of the following conditions: the engine is in a running state, a clutch transmission gear of the vehicle is in a forward gear, a vehicle speed is less than a first preset vehicle speed threshold, an electronic stability system of a vehicle body of the vehicle is in an off state, an electronic parking brake system of the vehicle is in an off state, a seat belt of the vehicle is in a fastened state, and a power system of the vehicle is trouble free.

4. The method according to claim 3, wherein the method further comprises:
   acquiring second vehicle state data;
   when the second vehicle state data satisfies any one of second preset conditions for quitting the activated state, controlling the vehicle to quit the activated state of the launch starting function;
   wherein the second preset conditions comprise one or more of the following conditions: the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range;
   wherein the second preset opening degree threshold is less than the first preset opening degree threshold, and the second preset vehicle speed threshold is greater than the first preset vehicle speed threshold.

5. The method according to claim 1, wherein when the vehicle is in the activated state, the step of controlling the engine of the vehicle to output the target torque according to the opening degree of the accelerator pedal, and controlling the brake state of the vehicle according to the pressure of the brake master cylinder, comprises:
   receiving an engine speed limit threshold sent by a clutch transmission, wherein the engine speed limit threshold is used for ensuring that the vehicle is capable of keeping still when the pressure of the brake master cylinder is greater than the first preset pressure threshold; and
   determining the target torque according to the engine speed limit threshold and the opening degree of the accelerator pedal, and controlling the engine to output the target torque.

6. The method according to claim 5, wherein the step of determining the target torque according to the engine speed limit threshold and the opening degree of the accelerator pedal, and controlling the engine to output the target torque, comprises:
   determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and
   sending the air path torque of the engine and the fire path torque of the engine to the engine, so that the engine outputs the fire path torque of the engine as the target torque.

7. The method according to claim 1, wherein the method further comprises:
   when the vehicle does not move within a preset duration after entering the activated state, controlling the vehicle to enter a standby state of the launch starting function; and
   when the vehicle is in the standby state, the pressure of the brake master cylinder is no greater than a second preset pressure threshold, and the opening degree of the accelerator pedal is no greater than a third preset opening degree threshold, controlling the vehicle to quit the standby state;

wherein the second preset pressure threshold is less than the first preset pressure threshold, and the third preset opening degree threshold is less than a second preset opening degree threshold.

8. The method according to claim 1, wherein the method further comprises:

when the vehicle is in the activated state and the pressure of the brake master cylinder is no greater than the first preset pressure threshold, increasing an engine speed threshold required by a clutch transmission during gear shifting to a preset target value.

9. The method according to claim 8, wherein the method further comprises:

when the vehicle is in the activated state, increasing a safe torque threshold of the clutch transmission.

10. A non-transitory computer-readable medium including a computer-readable code stored thereon, and when the computer-readable code is executed by a processor, the vehicle control method according to claim 1 is performed.

11. A vehicle control apparatus, comprising:
one or more processors; and
a storage device storing a computer program, when the computer program is executed by the one or more processors, the vehicle control apparatus is made to perform operations comprising:
acquiring a pressure of a brake master cylinder and an opening degree of an accelerator pedal;
when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and
when the vehicle is in the activated state, controlling an engine of the vehicle to output a target torque according to the opening degree of the accelerator pedal, and controlling a brake state of the vehicle according to the pressure of the brake master cylinder.

12. The vehicle control apparatus according to claim 11, wherein the operations further comprise:
acquiring first vehicle state data;
when the first vehicle state data satisfies all first preset conditions for entering the activated state, controlling the vehicle to enter the activated state of the launch starting function; and
wherein the first preset conditions comprise one or more of the following conditions: the engine is in a running state, a clutch transmission gear of the vehicle is in a forward gear, a vehicle speed is less than a first preset vehicle speed threshold, an electronic stability system of a vehicle body of the vehicle is in an off state, an electronic parking brake system of the vehicle is in an off state, a seat belt of the vehicle is in a fastened state, and a power system of the vehicle is trouble free.

13. The vehicle control apparatus according to claim 12, wherein the operation of when the vehicle is in the activated state, controlling the engine of the vehicle to output the target torque according to the opening degree of the accelerator pedal, and controlling the brake state of the vehicle according to the pressure of the brake master cylinder comprises:

receiving an engine speed limit threshold sent by a clutch transmission, wherein the engine speed limit threshold is used for ensuring that the vehicle is capable of keeping still when the pressure of the brake master cylinder is greater than the first preset pressure threshold; and
determining the target torque according to the engine speed limit threshold and the opening degree of the accelerator pedal, and controlling the engine to output the target torque.

14. The vehicle control apparatus according to claim 13, wherein the operation of determining the target torque according to the engine speed limit threshold and the opening degree of the accelerator pedal, and controlling the engine to output the target torque comprises:

determining an air path torque of the engine and a fire path torque of the engine according to the engine speed limit threshold and the opening degree of the accelerator pedal, wherein the air path torque of the engine is greater than the fire path torque of the engine, and a difference between the air path torque of the engine and the fire path torque of the engine is a preset torque threshold; and
sending the air path torque of the engine and the fire path torque of the engine to the engine, so that the engine outputs the fire path torque of the engine as the target torque.

15. The vehicle control apparatus according to claim 12, wherein the operations further comprise:
acquiring second vehicle state data; and
when the second vehicle state data satisfies any one of second preset conditions for quitting the activated state, controlling the vehicle to quit the activated state of the launch starting function;
wherein the second preset conditions comprise one or more of the following conditions: the engine is not in the running state, the clutch transmission gear is not in the forward gear, a brake instruction is received when the vehicle speed is greater than a second preset vehicle speed threshold, the electronic stability system of the vehicle body is in an on state, the electronic parking brake system is in an on state, the seat belt is in an unfastened state, and the power system of the vehicle is in trouble, the opening degree of the accelerator pedal is less than a second preset opening degree threshold, and a temperature of the engine is not in a preset operating temperature range;
wherein the second preset opening degree threshold is less than the first preset opening degree threshold, and the second preset vehicle speed threshold is greater than the first preset vehicle speed threshold.

16. The vehicle control apparatus according to claim 11, wherein the operations further comprise:
when the vehicle does not move within a preset duration after entering the activated state, controlling the vehicle to enter a standby state of the launch starting function; and
when the vehicle is in the standby state, the pressure of the brake master cylinder is no greater than a second preset pressure threshold, and the opening degree of the accelerator pedal is no greater than a third preset opening degree threshold, controlling the vehicle to quit the standby state, wherein the second preset pressure threshold is less than the first preset pressure threshold, and the third preset opening degree threshold is less than a second preset opening degree threshold.

17. The vehicle control apparatus according to claim 11, wherein the operations further comprise:
when the vehicle is in the activated state and the pressure of the brake master cylinder is no greater than the first preset pressure threshold, increasing an engine speed threshold required by a clutch transmission during gear shifting to a preset target value.

18. A vehicle, comprising the vehicle control apparatus according to claim 11.

19. The vehicle according to claim 18, wherein the operations further comprise:
acquiring first vehicle state data;
when the first vehicle state data satisfies all first preset conditions for entering the activated state, controlling the vehicle to enter the activated state of the launch starting function; and
wherein the first preset conditions comprise one or more of the following conditions: the engine is in a running state, a clutch transmission gear of the vehicle is in a forward gear, a vehicle speed is less than a first preset vehicle speed threshold, an electronic stability system of a vehicle body of the vehicle is in an off state, an electronic parking brake system of the vehicle is in an off state, a seat belt of the vehicle is in a fastened state, and a power system of the vehicle is trouble free.

20. A computing-processing device, comprising:
a memory in which a computer-readable code is stored; and
one or more processors, wherein when the computer-readable code is executed by the one or more processors, the computing-processing device executes a vehicle control method, wherein the method comprises:
acquiring a pressure of a brake master cylinder and an opening degree of an accelerator pedal;
when the pressure of the brake master cylinder is greater than a first preset pressure threshold, the opening degree of the accelerator pedal is no less than a first preset opening degree threshold, and a moment when the pressure of the brake master cylinder is greater than the first preset pressure threshold is earlier than a moment when the opening degree of the accelerator pedal is no less than the first preset opening degree threshold, controlling the vehicle to enter an activated state of a launch starting function; and
when the vehicle is in the activated state, controlling an engine of the vehicle to output a target torque according to the opening degree of the accelerator pedal, and controlling a brake state of the vehicle according to the pressure of the brake master cylinder.

* * * * *